United States Patent [19]

Glynn. Jr. et al.

[11] Patent Number: 5,173,115
[45] Date of Patent: Dec. 22, 1992

[54] ASPHALTIC CONCRETE PRODUCT AND A METHOD FOR THE FIXATION OF CONTAMINATED SOILS IN THE ASPHALTIC CONCRETE

[75] Inventors: John J. Glynn. Jr., Natick; Nathan Wiseblood, Hopkinton, both of Mass.

[73] Assignee: American Reclamation Corporation, Southborough, Mass.

[21] Appl. No.: 726,858

[22] Filed: Jul. 8, 1991

Related U.S. Application Data

[63] Continuation of Ser. No. 496,962, Mar. 20, 1990, abandoned.

[51] Int. Cl.⁵ .............................................. C08L 95/00
[52] U.S. Cl. ................... 106/281.1; 106/277; 106/282
[58] Field of Search ...................... 106/277, 281.1, 282

[56] References Cited

U.S. PATENT DOCUMENTS 4,373,961 2/1983 Stone ................................ 106/281.1

OTHER PUBLICATIONS

Civil Eng.-"Making Use of Contaminated Soil" Dec. 1988-Czarnecki.

Primary Examiner—Paul Lieberman
Assistant Examiner—M. Dinunzio
Attorney, Agent, or Firm—Samuels, Gauthier & Stevens

[57] ABSTRACT

A process for the fixation of hydrocarbons found in contaminated oily soil. The contaminated oily soil is used as a component in a cold mix asphaltic concrete. The soil is mixed with asphalt roof cuttings containing fibers and mineral aggregate to form a mixture. This mixture is coated with a cold mix emulsion to form an asphaltic concrete. The hydrocarbons do not leach from the set concrete.

17 Claims, 1 Drawing Sheet

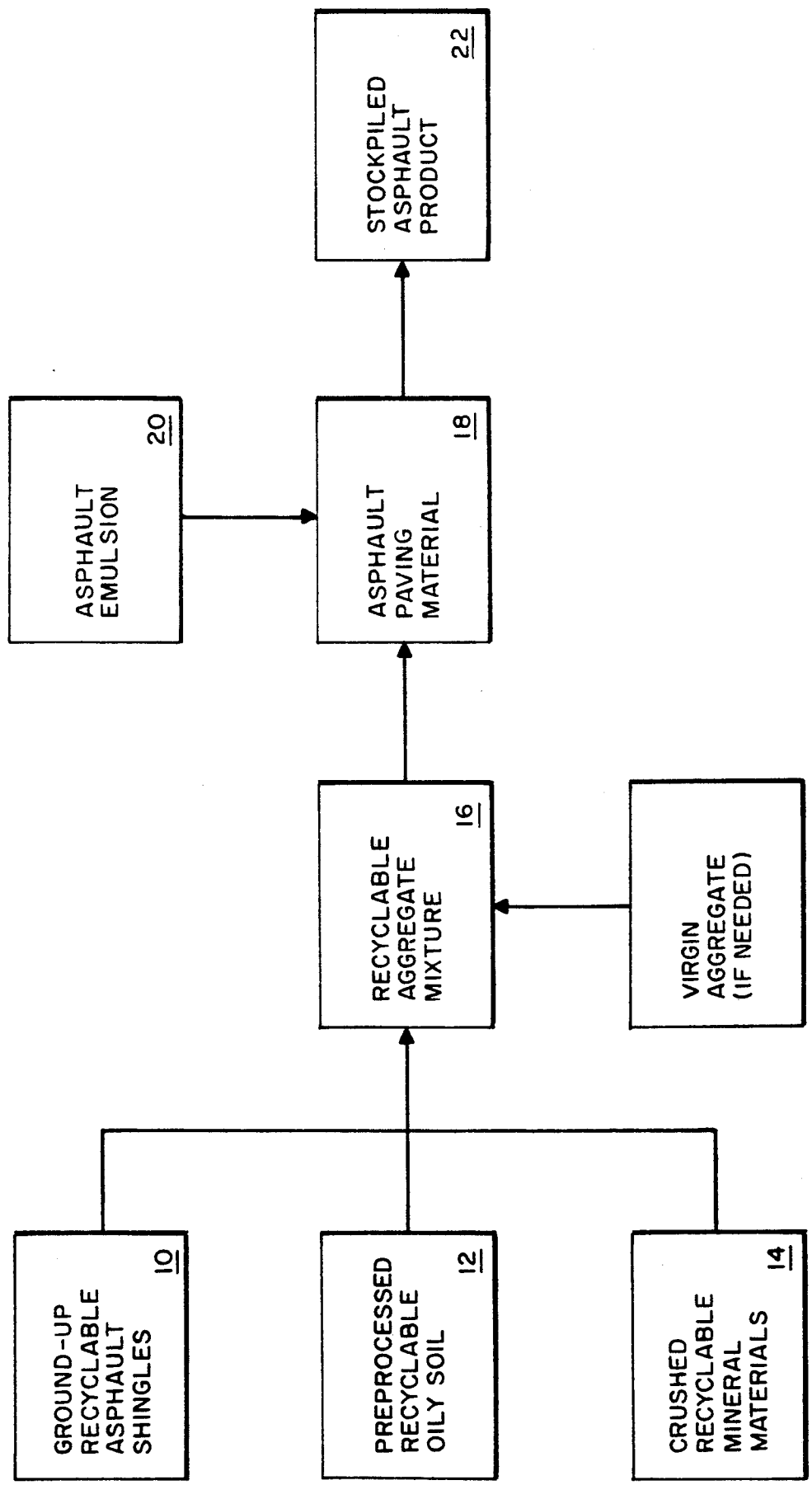

ASPHALTIC CONCRETE PRODUCT AND A METHOD FOR THE FIXATION OF CONTAMINATED SOILS IN THE ASPHALTIC CONCRETE

This is a continuation of co-pending application Ser. No. 07/496,962 filed on Mar. 20, 1990 now abandoned.

BACKGROUND OF THE INVENTION

This invention relates to a method of fixing contaminated soils in asphaltic concrete and the concrete manufactured by the method.

The essence of a "concrete" is viscosity or thixotropicity. At the time of application it has to be quasiliquid, like a slurry, or at least a material with a pasty plasticity that can be deformed by mechanical operations into the shape in which it is to be used. It has to be able to adhere to a surface if it is a coating, and it has to set up into a degree of hardness that is suitable for the kind and class of operation.

Unlike those concretes which are used as structural elements, asphaltic concrete is generally applied as a layer on a nearly horizontal surface or as a low structure such as a curb or "speed bump". As a regulated component in the governmental infrastructure, asphaltic concrete is subject to very stringent specifications down to the particle size distribution of the aggregate, but for private and commercial use quite satisfactory performance can be achieved with a considerable variation in formulations. Asphaltic concretes containing additives like rubber can be made for special uses like tennis courts and running tracks.

The use of asphalt as an adhesive has a very long history. Some of the most primitive artifacts, like spears and arrows, used naturally-occurring asphalt and natural fibers to attach the stone point to the wooden shaft. It has also been used as a preservative by means of encapsulation—asphalt is found in the formulary of Egyptian mortuaries of the classic period.

Asphalt is produced as a joint product with gasoline and oil in the refining of crude oils. In principle, crude oil could be reconstituted by mixing asphalt, oil, kerosene, gasoline, and naphtha in the proper proportions. In practice, asphalt and the other petroleum products are miscible, if not quite in any proportion, at least over very wide ranges of proportions. If asphalt and kerosene are mixed, a dirty-brown kerosene, or a gummy asphalt, or an intermediate oily substance can result; but within wide variations the mixture does not divide into phases. A small proportion of petroleum product mixed with asphalt merely produces asphalt of a slightly different specification or characterization.

Turning asphalt into concrete involves producing a material that is plastic when it is applied and hard when it sets up, and there are two conventional ways of doing that. They are, for appropriate reasons, called the "hot mix" and "cold mix" processes.

In the hot mix process, the asphalt is liquified by heating. As in most things, the viscosity of asphalt decreases with increasing temperature and it is a liquid at a temperature sufficiently below its flash point to be safe to use. The melted asphalt is mixed with aggregate and kept hot during the mixing stage. It is then transported, still hot, to the workplace, or it is stored in heated silos until it can be transported.

Obviously this hot liquid asphalt cannot be mixed with cold, wet aggregate. If the aggregate is cold enough it will immediately cause the asphalt to cool, producing a solidified mass of asphaltic concrete where a plastic mass is desired. If the aggregate is wet there will be explosions of steam when it mixes with the hot asphalt. Hot mix plants, therefore, incorporate a rotary kiln to dry the aggregate and heat it to a few hundred degrees F. It then mixes with the asphalt without difficulty.

The use of hot mix asphalts with contaminated soil has been described, see Czarnecki, R. C., Making Use of Contaminated Soil, Civil Eng., December, 1988, pp. 72-74. When the aggregate is soil contaminated with petroleum products the kiln drying process introduces a number of problems, or at least constraints. The conventional asphalt plant drying kiln is heated with an open flame directed into the rotating barrel from the outlet end. Obviously the first constraint must be that the contamination level is sufficiently low so the open flame does not ignite the petroleum or cause the vapors to explode.

As the aggregate progresses down the rotary kiln it gradually heats up to the 500°-800° F. that it reaches at the outlet of the kiln. This produces a gradual distillation of the contamination, so that the light ends are driven off near the entry to the kiln, where there may be no open flame. They are then typically drawn off by exhaust fans, and pass through the air pollution control system (usually a cloth filter or "baghouse"), and are exhausted into the atmosphere. Since these unburned hydrocarbon fumes are not collected by the baghouse, they can contribute significantly to the air pollution produced by the hot mix plant.

As the contaminated soil proceeds down the kiln, the heavier components are distilled off. If these are not ignited by the open flame heater, they will be drawn off by the exhaust fans and cooled in the plenum of the baghouse. There they can combine with the airborne particulates ("fines") and produce a kind of asphaltic concrete that adheres to the baghouse filters, making them difficult to keep clean. Those heavy components that remain with the aggregate are no problem because they combine with the liquid asphalt in the mixing part of the operation.

In the cold mix process, when the concrete is mixed, the asphalt is in the form of an emulsion in which the particles of asphalt are kept suspended in the liquid and separated from each other and the aggregate by a film of water. Under pressure, the film of water is expelled and the asphalt comes into contact with itself and the aggregate. In the process it cements the aggregate into a hard concrete that is essentially identical to the hot mix bituminous concrete.

Some of these emulsions incorporate oils as well as the usual asphalt, water, and emulsifying agents because the oil serves to soften the asphalt and make for better adhesion to other additives and fillers.

The use of cold mix asphalts with contaminated soils has been described, see Eklund, K., Incorporation of petroleum-contaminated soils into bituminous concrete, petroleum contaminated soils, V-1, Lewis Publishers, Chelsea, Mich. Although attempts have been made to incorporate hydrocarbon contaminated soils into cold mix concretes, the results have not been satisfactory. In order to use asphaltic concrete, either federal or state regulations must be complied with. These regulations pertain both to the physical properties of the material to be used—whether it's a base layer, intermediate layer, or top coat and the chemical properties, the components of the asphaltic concrete must not leach. The drawbacks in the use of the contaminated soils are first the soil itself may range from stone, sand, silt to clay and thus have a wide range of sizes, including rocks, etc. Secondly, the soil may contain in varying amounts, gasoline, lubricating oils, and Nos. 2 through 6 fuel oils in any combination. This requires that a soil and chemical analysis be made. If the contaminated soil is to be used, then the other standard components used in the process for making asphaltic concrete must be adjusted each time in order to accommodate each different batch of contaminated soil to produce an asphaltic concrete that meets specification. More importantly, because of the uncertainty of the precise nature of the chemical contaminants, at the minimum a sample batch of bituminous concrete must be made and tested. Even if the sample meets specifications re: leaching, when the process is scaled up for a production run, due to the normal problems encountered in such a scale up, there still is not complete certainty the final product will meet specifications. At least for these reasons, the use of contaminated soils in cold mix asphaltic concrete has not gained commercial acceptance.

We have discovered a process and the product of the process that uses contaminated soils for the manufacture of cold mix asphaltic concrete. Our process "fixes" the hydrocarbons such that they do not leach from the final product. This fixation is consistent regardless of either the hydrocarbon mix or the soil mix. After an initial analysis of the contaminated soil, it is then used directly in production runs.

SUMMARY OF THE INVENTION

Broadly, the invention mixes sized contaminated soil with a fibrous asphalt and aggregate to form an aggregate asphaltic concrete mixture. This mixture is combined with an asphalt emulsion to form a cold mix asphaltic concrete.

The fibrous asphalt has a hydrocarbon content of between 5 to 15% by weight, usually 10% by weight. The fibrous material is typically fiberglass matting material In the preferred embodiment the source of the fibrous asphalt is waste cuttings of asphalt roofing shingles. The specifications for these shingles are defined in ASTM Spec. No. D2178-86A, which specification is hereby incorporated by reference in its entirety into this disclosure.

The contaminated soil can range from clay to gravel having varying particle sizes, and can contain hydrocarbons including naphtha, gasoline, lubricating oils, and fuel oils and the like.

The aggregate broadly comprises sized mineral materials such as reclaimed asphaltic concrete, construction concrete, bricks, stone, etc.

The asphalt emulsion comprises those emulsions currently used as 'cold mix emulsions'. Preferably, these emulsions are slow-setting emulsions known in the trade as SS-1 and SS-1h emulsions. These emulsions are defined in ASTM Specification No. D977, which reference is incorporated by reference in its entirety into this disclosure.

Broadly the method of our invention includes mixing asphalt roof cuttings, which contain fibrous materials, with contaminated oily soil containing hydrocarbons. Mineral aggregate is mixed with the cuttings and contaminated soil in an amount and aggregate size depending upon the final use of the asphaltic concrete. The mixture is coated with an asphalt emulsion to form the asphaltic concrete. After mixing, the hydrocarbons originally present in the contaminated soil are fixed within the concrete and the concrete is used in the standard way.

The composition of our invention comprises a mixture of asphalt roof cuttings containing fibrous material, contaminated oily soil containing hydrocarbons and mineral aggregate in a size and an amount depending upon the use of the final product. The materials are coated with a cold asphalt emulsion and all components are mixed in amounts such that the hydrocarbons are fixed in the concrete when the concrete is set and do not leach therefrom.

BRIEF DESCRIPTION OF THE DRAWING

The drawing is a process flow diagram of a process embodying the invention.

DESCRIPTION OF THE PREFERRED EMBODIMENT(S)

The uses of asphaltic concretes, whether hot mix or cold mix and their compositions, are basically dictated by state, federal and local regulations. The asphaltic concrete disclosed herein meets applicable regulations and particularly meets or exceeds those regulations regarding leaching of contaminants into the ground. The following are exemplary of uses and compositions of the asphaltic concrete disclosed herein. A typical road paving structure is as follows:

8" Base—2" aggregate coated with asphalt emulsion
4" Binder—¼" aggregate coated with asphalt emulsion
1" Surface Sealer The Base is usually applied to a depth of 8". It primarily consists of 1 to 2 inch aggregate. This aggregate is then placed in a cold mix asphalt mixer and coated with an asphalt oil emulsion. The Base is put in place and compacted with conventional paving equipment.

The binder material can be applied in a thickness of from 2" to 6". The binder primarily consists of ¼" aggregate. The aggregate is placed into a cold mix asphalt mixer and coated with an asphalt oil emulsion. Compaction is accomplished with conventional hydraulic vibratory rollers.

A formula for a base mixture of the invention is:

| DENSE GRADED BASE | |
| --- | --- |
| Total Percent of Aggregate (including Course, Fine Asphalt; Roof Cuttings, Contaminated Oily Soils, RAP, RAM and Mineral Filler) | |
| Sieve Size | Passing by Weight |
| 2 in. | 100 |
| ¾ in. | 80–100 |
| No. 4 | 40–75 |
| No. 30 | 20–50 |
| No. 50 | 10–30 |
| No. 200 | 0–8 |
| Asphalt Content after 4 hrs. @ 150 F. | 4–6 Percent by weight of total mix |

This base course mixture meets the following test criteria.

| MARSHALL TESTS - after 4 hrs. @ 150° F. and compacted 50 blows @ 140° F.: | |
| --- | --- |
| Density, P.C.F. | 120 to 150 |
| Voidless Density P.C.F. | 120 to 150 |
| % Void Compacted: | |

-continued

MARSHALL TESTS - after 4 hrs. @ 150° F.
and compacted 50 blows @ 140° F.:

| | |
|---|---|
| a. Pavements | 3 to 8 |
| b. Land Fill Topping | 0 |
| Stability @ 140° F., lbs. | 500 |
| Flow @ 140° F., 0.1 .ms | 12 to 20 |
| Stability @ 77° F., lbs. | 1000 |
| Flow @ 77° F., .01 ms. | 8 to 16 |

A formula for a binder surface mixture of the invention is:

| Sieve Size | Total Percent of Aggregate (including Course, Fine Asphalt; Roof Cuttings, Contaminated Oily Soils, RAP, RAM and Mineral Filler) Passing by Weight | |
|---|---|---|
| ⅞ in. | 100 | |
| ½ in. | 85–100 | |
| ⅜ in. | 70–100 | |
| No. 4 | 55–80 | |
| No. 8 | 30–55 | |
| No. 16 | 15–45 | |
| No. 30 | 10–30 | |
| No. 50 | 5–25 | |
| No. 100 | 2–20 | |
| No. 200 | 1–10 | |
| Asphalt Content after 4 hrs. @ 150 F. | 5.5–8.0 | Percent by weight |

As used in this disclosure, the following terms shall have the following definitions:

Course Mineral Aggregate

The course mineral aggregate is clean, crushed mineral material consisting of angular fragments obtained by breaking and crushing shattered natural rock, stone and recycled aggregate materials, free from a detrimental quantity of thin elongated pieces, dirt or other objectionable materials. Size is determined by end use.

Fine Mineral Aggregate

The fine mineral aggregate is a blend of natural sand, stone, and stone screenings and screened recycled aggregate. Fine aggregate is natural or the product of a secondary crusher and does not contain excess dirt, clay, organic matter or other deleterious material. Size is determined by end use.

Asphalt Roof Cuttings

Asphalt roof cuttings preferably do not exceed 1" in size and contain no foreign materials, such as wood, nails or other deleterious substances. Asphalt roof cuttings contain asphalt, fiberglass fibers, and crushed stone.

Contaminated Oily Soil

Any soil ranging from sand to clay in any particle size comprising petroleum products including any combination and amount of gasoline, lubricating oils, fuel oils Nos. 2–6, etc. It is to be understood that other contaminants may be present in the soil.

Reclaimed Asphalt Pavement (RAP)

Reclaimed Asphalt Pavement (RAP) comprises materials obtained from highways or streets by crushing, milling or planing existing pavements. The material has a reasonably uniform gradation from fine to course as defined by sieve analysis and is not contaminated by foreign materials

Reclaimed Aggregate Materials (RAM)

Reclaimed Aggregate Materials (RAM) comprises crushed concrete, bricks, gravel and stone. This material preferably has no particles larger than 2 inches. The material has a reasonably uniform gradation from fine to course as defined above and is not contaminated by foreign materials.

Mineral Filler

Mineral filler comprises approved Portland Cement, limestone dust, hydrated lime, stone float, stone dust, fly ash, or other suitable materials.

Emulsion

The emulsion comprises asphalt, water, pumice, soap, caustic soda and/or other non-hazardous emulsifiers. Preferably, SS-1 and SS-1h emulsions are used alone or in combination.

The cold mix asphaltic concrete disclosed herein can be pre-mixed and stored at a manufacturing site or mixed at the construction site. The following Table sets forth ranges of components used for preparation of the asphaltic concrete and will vary depending upon the ultimate use of the mix whether for base, surface pavings, etcetera.

| Material | % By Wgt. | |
|---|---|---|
| | Min. | Max. |
| RAM and mineral aggregate | 20 | 40 |
| Roofing shingle cuttings | 10 | 15 |
| RAP | 10 | 20 |
| Contaminated soil (oily soil) | 30 | 40 |
| Asphalt emulsion | 6 | 12 |

The ratio of contaminated soil to emulsion is approximately 5 parts soil to 1 part emulsion.

The preferred embodiment will be described with reference to the preparation of an asphaltic concrete base. The contaminate soil is first analyzed to determine its hydrocarbon content in ppm. Preferably, the amount is less than 60,000 ppm. If more than 60,000 ppm, clean fill can be used to reduce the ppm level. This standard is determined by State regulations on the handling and disposal of contaminated soils and is not to be construed as a limitation of the invention. Referring to the drawing, graded asphalt roof cuttings shingles in an amount of 25% by volume and less than about one inch in size from a source 10 are combined with contaminated oily soil from a source 12 and crushed recyclable mineral materials from a source 14, in a mixer 16. The soil is graded to 2 inch minus, ¾ inch minus and ½ inch minus. Depending upon use, one of these graded soils is added in an amount of 30 to 40%. The aggregate is also graded to 2 inch minus, ¾ inch minus and ½ inch minus. Depending upon use, one of these graded aggregates is added in an amount of 20 to 40%. For this embodiment, the contaminated soil has a composition of clay, silt, sand and gravel, and a hydrocarbon content of less than 60,000 ppm. After blending in a mixture 16, the mix is transferred to a pug mill 18 and an SS-1 asphalt emulsion from a source 20 is added in an amount of 6 to 12%.

After thorough mixing, the final product is stockpiled at 22.

The amounts of materials used in any mix is first based on the end use of the concrete. Within the federal or state specifications, there is a certain latitude which allows for a 'fine tuning' of each production run. This fine tuning, as is well known in the art, is primarily a visual observation. If the mix appears too dry or too runny, aggregate, asphalt or emulsion is added as needed until the mix has the proper consistency.

In an alternative embodiment of the invention, certain additives are added to the mix either initially in the emulsion or in the mixing stage where the emulsion is mixed with the asphaltic concrete mixture. Elastomers (rubber) natural or synthetic including sodium polysulfide, polychloroprene (neoprene); butadiene-styrene copolymers (SBR); acrylonitrile-butadiene copolymers; ethylene-propylene-diene rubbers; synthetic polyisoprene; butyl rubber; polyacrylonitrile; silicon; epichlorohydrin; and polyurethane can be added in an amount of from 0.5 to 5.0% by weight based on the total weight of emulsion used in the concrete. It is believed these elastomers enhance the binding of the materials present in the mix.

In still another embodiment of the invention, either alone or in combination with the use of the elastomers, a dessicant, such as CaO.MgO, is used in amounts of 0.5 to 5.0% by weight based on the total weight of the emulsion used in the mix to remove excess water and allow cold weather mixing and paving by raising the temperature of the mix up to about 20° F. Further, it is believed that the hydrated line will facilitate the coating of the asphalt cement emulsions and increase cementitious action. Also, the lime breaks down deleterious organic matter to provide a more acceptable asphaltic concrete.

Test Results

Analyses of leachate from samples of a cured asphaltic concrete made using recycled crushed aggregate, ground asphalt shingles, oily soils, and asphalt emulsion showed levels of total petroleum hydrocarbons and volatile organic compounds below the detection limits for the test. Crushed samples of bituminous concrete were soaked and agitated in a rainwater sample over a period of one week. The resultant leachate was collected and analyzed to determine residual levels of volatile organic compounds and total petroleum hydrocarbons.

Methodology

A sample was taken of a asphaltic concrete mixture made according to the invention. This sample was a mixture of recycled crushed aggregate, ground asphalt shingles, oily soil and an asphalt emulsion specifically. The sample was heated to 180° F. to speed curing and formed into a three inch diameter cylinder three inches high.

A similar cylinder containing a sample of a commercial hot-mix bituminous concrete was also tested. A five gallon pail with a clean plastic liner was used to collect a sample of natural rainwater. A sample of unprocessed contaminated oily soil (believed to have been contaminated with virgin light fuel oil) was also tested.

400 milliliters of rainwater were placed in each of four clean quart sample jars. Each of the two bituminous concrete samples were fractured into small, relatively uniform pieces using a hammer. Four specimens were prepared:

Sample A: Control, this jar contained a 400 ml sample of rainwater.
Sample B: This jar contained 400 grams of unprocessed oily soil mixed with 400 ml of rainwater.
Sample C: This jar contained 400 grams of hot-mix bituminous concrete mixed with 400 ml of rainwater.
Sample D: This jar contained 400 grams of cold-mix concrete mixed with 400 ml of rainwater.

At the end of seven days the liquid was poured off into a clean sample jar. To this leachate was added 600 ml of tap water. The samples were then each divided into two VOC vials and a one liter bottle.

Each of the four one liter samples were analyzed for TPH (IR) and pH according to "Standard Methods of Water and Wastewater Analysis" 16th edition. The results are tabulated below:

| PARAMETER | A | B | C | D | Detection Limit |
|---|---|---|---|---|---|
| pH | 7.34 | 7.99 | 7.72 | 9.28 | |
| TPH (IR) | <0.5 | <0.5 | <0.5 | <0.5 | 0.5 mg/l |

< Indicates less than

The pH of Sample D was found to be higher than that of the other samples. The asphalt emulsion used in the asphaltic concrete formulation typically has a pH in the range of 10.5 to 11.5. The alkalinity of sample D can be attributed to the use of the specific asphalt emulsion. Sample D was tested for the following:

| COMPOUND | CONCENTRATION µg/l | DETECTION LIMIT µg/l |
|---|---|---|
| Benzene | ND | 1.0 |
| Toluene | ND | 1.0 |
| Chlorobenzene | ND | 1.0 |
| Ethylbenzene | ND | 1.0 |
| Total Xylenes | ND | 2.0 |
| 1,3 Dichlorobenzene | ND | 5.0 |
| 1,2 Dichlorobenzene | ND | 5.0 |
| 1,4 Dichlorobenzene | ND | 5.0 |

A mechanical analysis of the mix yielded the following results.

| Sieve Size | A Min. Agreg. | B Fine RAP | C Coarse RAP | Composite Mix (A + B + C) | Specification Min | Specification Max |
|---|---|---|---|---|---|---|
| 2-inch | 100 | | 100 | 100 | 100 | |
| ¾-inch | 95 | 100 | 98 | 96 | 80 | 100 |
| 4 | 68 | 99 | 2 | 71 | 40 | 75 |
| 30 | 44 | 38 | | 41 | 20 | 50 |
| 50 | 24 | 20 | | 23 | 10 | 30 |
| 200 | 8 | 5 | | 8 | 2 | 8 |
| % Bitumen | | 8.2 | 5.4 | 8.9 | 8 | 16 |

Tests made with sample D gave the following results:

| Parameter | Result | Specification Min | Specification Max |
|---|---|---|---|
| Density (Marshall-50 blows) PCF | 131 | 120 | 150 |
| Voidless Density (Theoret) PCF | 131 | 120 | 150 |
| % Voids (Compacted) | 0 | 0 | |
| Marshall Stability lbs. @ 140° F. | 525 | 500 | + |
| Marshall Flow (0.01") @ 140° F. | 22 | 12 | 30 |

| Marshall Stability @ 77° F. | | 1423 | 1000 | + |
|---|---|---|---|---|
| Marshall Flow @ 77° F. | | 11.5 | 8 | 16 |

| Gradation | % by weight | | | |
|---|---|---|---|---|
| Are | #2 | #3 | Min | Max |
| 2-inch | 100 | 100 | 100 | |
| ¾-inch | 94 | 93 | 80 | 100 |
| ½-inch | 89 | 87 | | |
| ⅜-inch | 86 | 83 | | |
| 4 | 72 | 73 | 40 | 75 |
| 8 | 65 | 67 | | |
| 16 | 55 | 58 | | |
| 30 | 43 | 45 | 20 | 50 |
| 50 | 27 | 29 | 10 | 30 |
| 100 | 12 | 14 | | |
| 200 | 6 | 7 | 2 | 8 |
| Bitumen, % | 5.5 | 6.8 | 5 | 8 |
| (1500 grams, Microwave 18 Minute, T-225° F.) | | | | |
| Moisture, % | 6.6 | 7.0 | | |

| Marshall Test Results: | Run # | | | Specs | |
|---|---|---|---|---|---|
| Cured at 150° F., 4 hrs. | 1 | 2 | 3 | Min | Max |
| Density - PCT | 135.8 | 139.6 | 140.9 | | |
| Air Voids % | 9.5 | 6.9 | 5.4 | 3-6 | |
| Stability @ 140° F. lbs. | 286 | 300 | 549 | 500 | + |
| Flow @ 140° F. .01" | 12.6 | 13.5 | 14.0 | 12 | 30 |
| Stability @ 25° F. 1 lb. | 880 | 1030 | 1360 | 1000 | + |
| Flow @ 25° F. 1 lb | 11.4 | 12.2 | 12.8 | 8-16 | |

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A method for both the manufacture of a cold mix asphaltic concrete and the fixation of hydrocarbons in contaminated oily soil which includes:
   (a) mixing the following components:
      asphalt roof cuttings containing fibers,
      contaminated oily soil containing 60,000 ppm hydrocarbons, and
      mineral aggregate to form an aggregate mixture;
   (b) effecting the mixing without melting the asphalt in the roof cuttings;
   (c) coating the mixture with a cold mix emulsion to form the asphaltic concrete; and
   (d) setting the concrete to fix the hydrocarbons whereby the hydrocarbons will not leach from the concrete when the concrete is set.

2. The method of claim 1 wherein the asphalt and shingles cuttings comprise hydrocarbons in an amount of about 10% percent by weight and the fibers are present in an amount of about 2 percent by weight.

3. The method of claim 2 wherein the cuttings are graded to a size of about less than 2 inches.

4. The method of claim 2 wherein the cuttings are added to the concrete mixture in an amount between 20 to 35 percent by weight.

5. The method of claim 1 wherein the contaminated soil is graded to below about 2 inches and the hydrocarbons are selected from the group consisting of gasoline, lubricating oils, and Nos. 2-6 fuel oils.

6. The method of claim 5 wherein the contaminated soil is added to the mixture in an amount between 30 to 40 percent by weight.

7. The method of claim 1 wherein the mineral aggregate is between ¾ to 2 inches in size.

8. The method of claim 1 wherein the mineral aggregate is between ¼ to ½ inch in size.

9. The method of claim 1 wherein the mineral aggregate is added to the mixture in an amount between 20 to 40 percent by weight.

10. The method of claim 1 wherein the emulsion comprises 5 percent of the total mixture.

11. The method of claim 1 which includes adding to the mixture recovered asphalt cement in an amount between 1 to 4 percent by weight.

12. The method of claim 1 which includes adding to the mixture an elastomer in an amount of 0.5 to 5 percent by weight based on the weight of the emulsion.

13. The method of claim 12 wherein the elastomer is styrene butadiene copolymer.

14. The method of claim 1 which includes adding to the mixture in an amount of 0.5 to 5 percent by weight based on the weight of the emulsion a dessicant.

15. The method of claim 14 wherein the dessicant is quick lime.

16. The method of claim 1 which includes:
   applying the mixture to a surface.

17. The method of claim 1 wherein the asphalt in shingle cuttings comprise hydrocarbons in an amount of about 10% by weight and the fibers are present in an amount of about 2% by weight; the cuttings are added to the concrete mixture in an amount of between 20-35% by weight, the contaminated soil is added to the mixture in an amount of between 30-40% by weight; the mineral aggregate is added to the mixture in an amount of between 20-40% by weight and the emulsion comprises about 5% by weight of the total mixture.

* * * * *